US009507843B1

(12) United States Patent
Madhavarapu et al.

(10) Patent No.: US 9,507,843 B1
(45) Date of Patent: Nov. 29, 2016

(54) EFFICIENT REPLICATION OF DISTRIBUTED STORAGE CHANGES FOR READ-ONLY NODES OF A DISTRIBUTED DATABASE

(71) Applicant: Amazon Technologies, Inc., Reno, NV (US)

(72) Inventors: Pradeep Jnana Madhavarapu, Mountain View, CA (US); Samuel James McKelvie, Seattle, WA (US); Anurag Windlass Gupta, Atherton, CA (US); Tengiz Kharatishvili, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 574 days.

(21) Appl. No.: 14/032,797

(22) Filed: Sep. 20, 2013

(51) Int. Cl.
*G06F 17/30* (2006.01)
*G06F 3/06* (2006.01)

(52) U.S. Cl.
CPC ... *G06F 17/30575* (2013.01); *G06F 17/30368* (2013.01); *G06F 3/067* (2013.01); *G06F 17/30188* (2013.01)

(58) Field of Classification Search
CPC ............... G06F 17/30575; G06F 17/30368; G06F 17/30188; G06F 17/30424; G06F 3/067; H04L 67/1097
USPC ........................................................ 707/624
See application file for complete search history.

(56) References Cited

U.S. PATENT DOCUMENTS

| 5,280,612 A | 1/1994 | Lorie et al. |
| 5,471,614 A | 11/1995 | Kakimoto |
| 5,524,205 A | 6/1996 | Lomet et al. |
| 5,530,850 A | 6/1996 | Ford et al. |
| 5,870,758 A | 2/1999 | Bamford et al. |

(Continued)

FOREIGN PATENT DOCUMENTS

EP     0675451     10/1995

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Thanh-Ha Dang
(74) *Attorney, Agent, or Firm* — Robert C. Kowert; Meyertons, Hood, Kowert & Goetzel, P.C.

(57) ABSTRACT

A distributed database system may efficiently replicate distributed storage system changes on one or more read-only nodes. Storage metadata that indicates an access scheme for obtaining data for a particular view of the database from a distributed storage system may be maintained at a read-only node. An update to the storage metadata may be received that indicates a change to the distributed storage system that affects the validity of read requests for a different particular view of the database. In some embodiments, the change may indicate which storage nodes may be storing data according to the different particular view of the database, such as a change in membership of a protection group for the data at the distributed storage system. The storage metadata at the read-only node may be updated according to the received update such that a subsequent read request for the different particular view of the database is sent to the distributed storage system according to the updated access scheme.

20 Claims, 11 Drawing Sheets

(56) References Cited

U.S. PATENT DOCUMENTS

| | | | |
|---|---|---|---|
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,308,456 B2 | 12/2007 | Friske et al. | |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,375,001 B2* | 2/2013 | San Martin Arribas | G06F 17/30584 707/634 |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 9,047,331 B2* | 6/2015 | Rao | G06F 17/30345 |
| 9,280,591 B1* | 3/2016 | Kharatishvili | G06F 17/30575 |
| 2002/0107835 A1 | 8/2002 | Coram et al. | |
| 2002/0143733 A1 | 10/2002 | Mukkamalla et al. | |
| 2004/0098373 A1* | 5/2004 | Bayliss | G06F 17/30545 |
| 2004/0133622 A1 | 7/2004 | Clubb et al. | |
| 2004/0249869 A1 | 12/2004 | Oksanen | |
| 2008/0183973 A1 | 7/2008 | Aguilera et al. | |
| 2009/0012932 A1* | 1/2009 | Romem | G06F 11/18 |
| 2009/0240664 A1* | 9/2009 | Dinker | G06F 12/0842 |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0161496 A1 | 6/2011 | Nicklin | |
| 2012/0041899 A1 | 2/2012 | Greene et al. | |
| 2012/0174112 A1 | 7/2012 | Vaidya et al. | |
| 2012/0191648 A1 | 7/2012 | Kuber et al. | |
| 2012/0297073 A1 | 11/2012 | Glover et al. | |
| 2012/0310985 A1 | 12/2012 | Gale et al. | |
| 2012/0310986 A1* | 12/2012 | Frantz | G06F 17/30306 707/792 |
| 2012/0310991 A1* | 12/2012 | Frantz | G06F 17/30306 707/799 |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0279930 A1* | 9/2014 | Gupta | G06F 11/1464 707/683 |

OTHER PUBLICATIONS

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11 g-SQL -Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28,2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

Michele Cyran et al "Oracle Database Concepts 10g Release 2 (10.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wiki/Isolation_(database_systems) on May 15, 2013, pp. 1-7.

U.S. Appl. No. 61/794,572, filed Mar. 15, 2013, Anurag Windlass Gupta, et al.

U.S. Appl. No. 61/799,609, filed Mar. 15, 2013, Anurag Windlass Gupta, et al.

U.S. Appl. No. 61/794,612, filed Mar. 15, 2013, Pradeep Jnana Madhavarapu et al.

U.S. Appl. No. 61/794,658, filed Mar. 15, 2013, Anurag Windlass Gupta, et al.

U.S. Appl. No. 61/799,632, filed Mar. 15, 2013, Anurag Windlass Gupta, et al.

U.S. Appl. No. 13/892,027, filed May 10, 2013, Anurag Windlass Gupta, et al.

U.S. Appl. No. 13/873,467, filed Apr. 30, 2013, Anurag Windlass Gupta, et al.

U.S. Appl. No. 13/902,381, filed May 24, 2013, Anurag Windlass Gupta, et al.

U.S. Appl. No. 13/893,004, filed May 13, 2013, Laurion Darrell Burchall et al.

U.S. Appl. No. 13/901,111, filed May 23, 2013, Anurag Windlass Gupta, et al.

U.S. Appl. No. 13/894,969, filed May 15, 2013, Grant Alexander Macdonald McAlister et al.

U.S. Appl. No. 13/903,674, filed May 28, 2013, Anurag Windlass Gupta, et al.

U.S. Appl. No. 14/033,343, filed Sep. 20, 2013, Tengiz Kharatishvili et al.

U.S. Appl. No. 14/032,721, filed Sep. 20, 2013, Tengiz Kharatishvili et al.

U.S. Appl. No. 14/036,783, filed Sep. 25, 2013, Anurag Windlass Gupta, et al.

U.S. Appl. No. 14/036,792 , filed Sep. 25, 2013, Samuel James McKelvie, et al.

U.S. Appl. No. 14/032,763, filed Sep. 20, 2013, Yan Valerie Leshinsky et al.

U.S. Appl. No. 14/032,681, filed Sep. 20, 2013, Samuel James McKelvie, et al.

* cited by examiner

EFFICIENT REPLICATION OF DISTRIBUTED STORAGE CHANGES FOR READ-ONLY NODES OF A DISTRIBUTED DATABASE

BACKGROUND

Distribution of various components of a software stack can, in some cases, provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, complex to maintain, and may over-serve many database use cases.

A read replica model may be used to scale out read processing. According to a typical read replica model, as changes are made to the structure of the database, a SQL record may be created in a logical replication log which may then be propagated to all the replicas. Each replica would then run these SQL statements locally on their own versions of the database. A read replica may access a distributed storage system storing data for the database. However, as changes to the distributed storage system occur, ignorant read-replicas may receive stale data or waste time in an attempt to determine the current location or scheme for accessing data stored for the database in the storage system. Updating information used to access the distributed storage system may also increase latency for outstanding read requests waiting to be processed.

Figure 1:
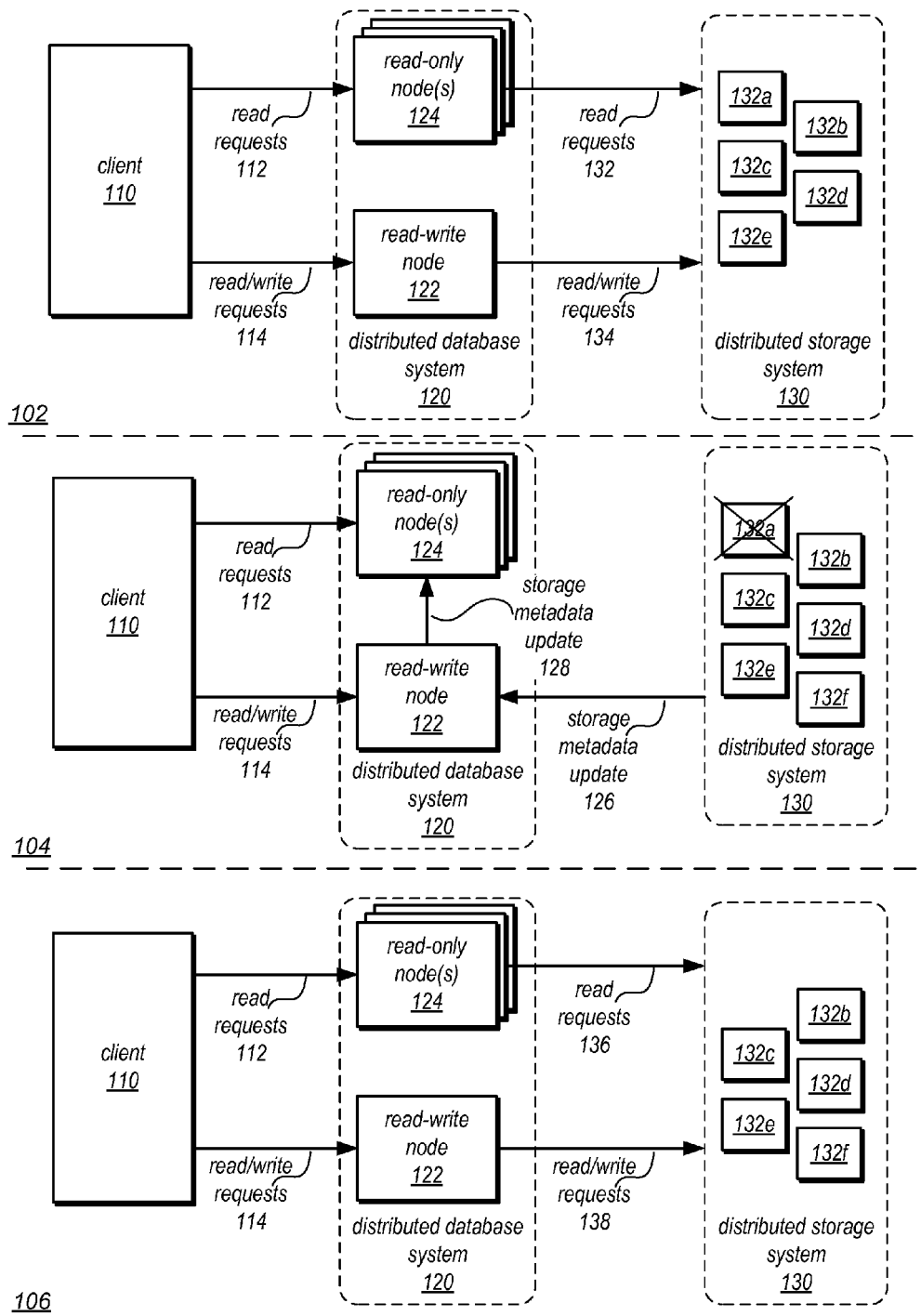
FIG. 1 is a series of block diagrams illustrating efficient replication of distributed storage changes for read-only nodes of a distributed database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of efficiently replicating distributed storage changes for read-only nodes of a distributed database system are disclosed. Various ones of the present embodiments may include a read-write node (or "leader," "master," or "primary" node) of a distributed database system. The read-write node may determine that change in the distributed storage system storing data for the distributed database has occurred. The change may affect the validity of a view or views of the database. For example, a group of storage node s, each storing a replica of data, such as a database table, for the distributed database, may together implement a quorum set for the data. Updates to the data may be persisted among different members (but not necessarily all members) of the quorum set. Thus, in some embodiments, each storage node may maintain a different view or version of the data based on the updates persisted at that storage node. Storage metadata updates sent from the read-write node to the read-only node may indicate which storage nodes in the quorum set maintain certain updates. In this way a read request may be sent to a particular quorum member, instead of sending read requests to several storage nodes to establish a read quorum. In another example, the storage nodes of a quorum set may implement a protection group for the data, and a membership change in the protection group (e.g., adding or removing a storage node) may be indicated in updates to storage metadata sent to the read-only node.

Storage metadata may be maintained at the read-write node which indicates an access scheme for the read-write node to write/read data from the distributed storage system. In at least some embodiments, the change may be determined by receiving an indication of the change from the distributed storage system change. Similarly, a change to the distributed storage system instigated by the read-write node may also be determined, such as when different updates are sent to different storage group nodes. When changes to the distributed storage system are determined, the read-write node may send an update indicating the change to one or more read-only nodes. The read-only node may then apply the requested update to storage metadata maintained at the read-only node. In at least some embodiments, the update indicating the change to the distributed storage system may be received without querying the distributed storage system. A subsequent read request received at the read-only node may then be processed according to the updated access scheme in the storage metadata maintained at the read-only node. Sending storage metadata changes to read-only nodes may allow read-only nodes to efficiently process read requests without having to request updated storage metadata from the read-write node or the distributed storage system.

Allowing different configurations of database components in order to optimize various operations performed is one advantage of distributed database systems. Read-only nodes (or read replicas), for instance, may allow a distributed database system to more efficiently respond to read requests by operating as a replica of the database managed by a read-write node, which may provide better service for applications with read-heavy database workloads. However, changes made to a distributed storage system maintaining data accessed by read-only nodes may affect the processing time for read requests. If, for example, one or more new storage nodes are added to a list of storage nodes storing data for the database, the read-only node may not be sending read-requests to the correct storage nodes. This may lead to several different inefficiencies. For example, read requests may receive data from a storage node that is stale (i.e. not current or not the correct view of the database requested by the read request). Or, read requests may be improperly balanced among storage nodes, overload some storage nodes with more read requests to process than others. Moreover, if a quorum model for persisting changes to the database object is implemented in the distributed storage system, read requests may be sent to nodes that do not satisfy quorum requirements for the data object (which may also lead to the return of stale database data). Typical solutions for replicating storage changes at a read-only node may wait until an error is detected, before querying for updated storage metadata (usually from the distributed storage system) to correctly access the distributed storage system (e.g., request data from the correct storage nodes). Such solutions, however, penalize the read-only node, reducing throughput and increasing latency for read requests. Instead, FIG. 1 provides an illustration of efficient replication of distributed storage changes for read-only nodes of a distributed database, according to some embodiments.

As illustrated at scene 102, distributed database system 120 may be a database system that maintains data for one or more clients, such as client 110, applications, or systems that utilize distributed database 100. A database table, for instance, or various other schemas (e.g., relational database), structures, or objects may be employed to organize data maintained by distributed database 100. Distributed database 100 may be configured to process any number of updates, requests, operations, or transactions with regard to storing and maintaining data for the database. Various different hardware and software components, such as servers or computing systems (e.g., computing system 1100 described below with regard to FIG. 11) may be used to implement different components within distributed database 120. Virtual nodes or instances may be implemented, for example, that function independently, even though they may be implemented on the same component or a lesser number of physical hardware components than the number of nodes.

Distributed storage system 130 may be a storage system that stores data for clients, such as distributed database system 120. Various different storage schemes may be implemented by distributed storage system 130. For example, in some embodiments distributed storage system 130 may implement log-structured storage for data. Data may be distributed across different components of distributed storage system 130, such as replicating, sharding, or erasure coding a data object among different storage nodes, like storage nodes 132*a*, 132*b*, 132*c*, 132*d*, and 132*e*. In at least some embodiments, a group of storage nodes may make up a quorum set and/or protection group for a data that persists changes to a data according to one or more protection group policies. For example, a write quorum for changes to the data may be required in order to acknowledge a write as committed to client 110. Different hardware and software components, such as servers or computing systems (e.g., computing system 1100 described below with regard to FIG. 11) may be used to implement different components within distributed storage system 130.

A read-write node 122 may be implemented as part of distributed database 120. Read-write node 110 may be configured to receive read or write requests 114 from clients 110, systems, or other components/devices external to distributed database system 120. A write request 114, for example, may be received at read-write node 122, which requests a value of a particular record maintained by distributed database 120 be modified to a new value. Write requests 114 may be processed by read-write node 122 by updating a database cache maintained at read write node and sending a write request 134 to distributed storage system 130 in order to persist the write. In at least some embodiments, read-write node 122 may send the write request 134 to a group of storage nodes, such as 132*a*-132*e*, and commit the write to client 110 when a number of storage nodes sufficient to satisfy a write quorum acknowledge the write. Read-write node 122 may track which ones of storage nodes acknowledge the write in storage metadata. Read-write node 122 may also be configured to process read requests 114, such as the request for one or more records, data values, or other portions of data maintained by distributed database system 120. For example, a database cache may contain frequently accessed data pages that are persistently stored in distributed storage system 130. If a read request 114 is received and the database cache does not contain a valid copy, then read-write node 122 may issue a read request 134 to a storage node of distributed storage system 130, such as storage node 132*a*, in order to obtain a copy of the data page. In at least some embodiments, read-write node 122 may be configured to process database updates or requests for the database, while other components, such as read-only nodes 124, may be configured to perform other operations.

Read-write node 122 may issue read/write requests 134 to specific storage nodes based, at least in part, on storage metadata maintained at the read-write node 122. Storage metadata may include an access scheme to obtain data from or write data to distributed storage system 130. For example, storage metadata may identify particular storage nodes, such as storage nodes 132*a*-132*e*, that store at least a portion of data for distributed database system 120. Storage metadata may include a list of identifiers and/or network addresses for storage nodes implementing storage services, as well as the various different protocols, tokens, keys, and/or requirements for communicating with the storage nodes. For read-write nodes that send read/write requests 134 for several different data objects, such as multiple different database tables, storage metadata may include mapping information for some or all of the storage nodes for the different data objects. For example, storage metadata may indicate that multiple different protection groups are used to store the data objects for distributed database system 120. In at least some embodiments, read-write node 122 may request a current version of storage metadata from distributed storage system 130, such as from a control plane or management module for distributed storage system 130.

In FIG. 1, read-only nodes 124 may process and respond to read requests 112, such as by providing a requested one or more records, data values, or other portions of data maintained by distributed database system 120. The read requests 112 processed by read-only nodes 120 may request data that is currently being, or has recently been updated by operations performed by read-write node 122. Read-only nodes 124 may, therefore, operate as a replica of a consistent state of distributed database system 120 in order to prevent returning data in a response to a read request that is not consistent with a view of the database maintained at read-write node 120 and/or persisted in distributed storage system 130. Read-only nodes 124 may also operate as a replica of a consistent state of distributed database system as of a particular point in time. For instance, if distributed storage is log structured, then a read-only node may process read requests for the database up to a particular consistency point, such as a log sequence identifier (LSN). In some embodiments read-only node(s) 124 may implement a database cache that maintains copies of frequently accessed data pages so that read-only node(s) 124 may not have to issue a read-request to distributed storage system 130 in order to service the read request. Read-only node(s) 124 may issue read-requests 132 to distributed storage system in order to obtain data, such as particular data page, or a particular version of a particular data page according to a particular view of the database.

Read-only node(s) 124 may also maintain storage metadata. Similar to storage metadata maintained above at read-write node 122, storage metadata maintained a read-only node(s) 124 may include an access scheme for obtaining data from distributed storage system 130. As previously discussed, storage metadata may providing mapping information, or instructions, policies, or any other type of information to identify storage nodes that store a data for distribute database system 120 in order to service a read request. Read requests may be associated with a particular view of the database (e.g., at a certain point in time), and the storage metadata may also include information for accessing the particular view of the database in order to service the read request. Also as noted above, read-only node(s) 124 may process read requests 112 for several different data objects such that storage metadata may include mapping information for some or all of the storage nodes for the different data objects. In at least some embodiments, read-only node(s) 124 may also request storage metadata from distributed storage system 130, such as a control plane or management module for distributed storage system 130.

Changes to a distributed storage system may occur. In some embodiments, storage system changes may occur dynamically or at the instigation of a distributed storage system. Storage system changes may also occur at the request of the distributed database system 120. As noted above, these changes may include indications of which storage nodes store data according to a consistency point, such as an LSN, or changes to members of a quorum set/protection group storing the data. When distributed storage system changes occur, storage metadata may become obsolete and may need to be updated in order to process future read and write requests at distributed database system 120. For example, as illustrated in scene 104, storage node 132*a* has become unavailable (e.g., node may be down, busy servicing other clients or performing other processes, etc. . . . ). In response to storage node 132*a* becoming unavailable to receive future write requests, distributed storage system may add an additional storage node 132*f* in order to store a replica of the data object for distributed storage system 120. Please note that storage node 132*a* may still be functioning and that storage node 132*f* may have already been online providing storage services for different systems or clients.

A consistency point may, in some embodiments, be associated with a particular view or version of the database. For example, if the data for the database is stored as part of log structured storage in the distributed storage system, the consistency point may be a particular point in the sequence of log records for the database (e.g., an LSN). Changes to storage metadata sent to the read-only node may also be associated with the particular view or version of the database indicated by the consistency point. In at least some embodiments, storage metadata changes may not be applied or used to determine storage nodes to service a read requests until after the consistency point with which the storage metadata update is associated with is received. For example, a read request may be received and a storage node to service the read request may be determined. An update to storage metadata that would exclude the determined storage node from servicing the read request is also received. However, if the read request is processed (or associated with a point) before the consistency point associated with the storage metadata update, then the storage metadata used to determine the storage node may still be valid. In another example, an additional storage node may have been added to the group of storage nodes maintaining the replica of the data object, instigating a change in the storage metadata including mapping information to the additional storage node. The read-only node may receive this update to the storage metadata and the consistency point indicator prior to receiving another read request. Thus, the additional storage node may be determined to service the read request based on the updated storage metadata.

As result of the changes to the distributed storage system 130, one or more storage metadata updates 126 may be sent to the read-write node. These storage metadata updates 126 may indicate the change to distributed database system that affects the validity of read and/or write requests for a particular view of the database. Updated mapping information, for instance, such as the identity of one or more additional storage nodes maintaining a replica of the data (e.g., storage node 132*0* may be indicated. Storage metadata updates may also include one or more storage nodes that no are no longer available for processing write/read requests (e.g., storage node 132*a*). In some embodiments, storage metadata updates may include a storage metadata version identifier (sometimes referred to as an epoch). This version identifier may indicate to read-write node 122 that a new version of storage metadata information is available. Storage metadata may identify which storage nodes store data up to or for a particular view of the database in time (e.g., an LSN). Read-write node 122 may then obtain this new storage metadata information from distributed storage system control plane service, such as a volume manager node. However, read-write node may discover the changes to distributed storage system 130, read-write node 122 may send the storage metadata update 128 to read-only nodes 124.

Read-only nodes 124 may receive the storage metadata update 128 and apply the update to the storage metadata maintained at the read only node for processing read requests. In at least some embodiments, read-only nodes 124 may receive a consistency point indication for the database. A consistency point indication may indicate that a view of the database is persisted at distributed storage system 130. For example, this consistency point indication may be a sequence (e.g., Log Sequence Number (LSN) or a version number for data maintained at distributed storage system 130. The consistency point indication may indicate to the read-only node to advance or change to a different view of the database. For example, in some embodiments, a read-only node may be instructed to return to a previous or prior view of the database by the consistency point indicator (or some other instruction). In some embodiments, the storage metadata update 128 may be associated with a particular view of the database that is advanced from the currently maintained view of the database at the read-only node. A storage metadata update may not be applied to the version of storage metadata maintained at read-only nodes 124 until a consistency point has been received. In this way, changes to the distributed storage system may be consistent with the view seen by both the read-only nodes 124 and the read-write node 122. However, as changes to the view of the database may be sent asynchronously from read-write nodes to read-only nodes, in some embodiments, allowing read-only nodes 124 to service read requests for a different view of the database than the read-write node 122. Read requests associated with a view of the database before the view indicated in the consistency point, may be serviced using storage metadata without the received update applied. While those read requests associated with a view of the database at or after the view associated with the updated to the storage metadata may be serviced using the updated access scheme in the storage metadata where the updates has been applied.

As illustrated in scene 106, read-only nodes 124 are still receiving read requests 122 (as is read-write node 122 which is also receiving write requests 114). Based, at least in part, on the updated access scheme in the storage metadata, read-only nodes 124 may determine a storage node to send read requests 136. For example, read-only nodes 124 may determine that a new storage node 132*f* may store a particular view of the database, and send to storage node 132*f* a read request for that particular view of the data object. Moreover, read-only nodes 124 may not waste time sending read-requests to storage nodes not maintaining the particular view of the database or processing read requests (such as storage node 132*a* which may still be operating even though it is not illustrated in scene 106), or may not need to send read requests to a read quorum of storage nodes. Similarly read-write nodes 122 may determine where to send read and write requests 138.

The specification first describes an example network-based database service that includes the disclosed read-only nodes implementing efficient replication of distributed storage system changes. Included in the description of the example network-based database service are various aspects of the example network-based database service, such as a database engine, read-only nodes, and a separate distributed database storage service. The specification then describes flowcharts of various embodiments of methods for efficiently replicating distributed storage changes for read-only nodes of a distributed database. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single primary node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because redo logs and not modified data pages are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time. Moreover, communications (e.g., a change notification, such as a cache invalidation request) sent from a primary node of the database tier to read-only nodes of the database tier may be asynchronous as well.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Note that the storage service illustrated and described in FIGS. 2-7 is simply an example. Other storage services that are coupled to the database engine and read-only nodes may also be used in various embodiments.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the aforementioned layers), and then adding glue logic to stitch them together. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a read-write node server, which may also be referred to herein as a read-write node server, that receives read and/or write requests from various client programs (e.g., applications) and/or subscribers (users), then parses them and develops an execution plan to carry out the associated database operation(s). For example, the read-write node may develop the series of steps necessary to obtain results for complex queries and joins. In some embodiments, the read-write node may manage communications between the database tier of the database system and clients/subscribers, as well as communications between the database tier and a separate distributed storage system.

In some embodiments, the read-write node may be responsible for receiving SQL requests from end clients through a JDBC or ODBC interface and for performing SQL processing and transaction management (which may include locking) locally. However, rather than generating data pages locally, the read-write node (or various components thereof) may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the read-write node may not be able to commit a transaction until and unless the client-side driver receives a reply from enough storage node instances to constitute a write quorum.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the database tier may support the use of synchronous or asynchronous read-only nodes (sometimes referred to as read-replicas) in the system, e.g., read-only copies of data on different nodes of the database tier to which read requests can be routed. In such embodiments, if the read-write node for a given database table receives a read request directed to a particular data page, it may route the request to any one (or a particular one) of these read-only copies. Or, in some embodiments, a client read request may be received directly by a read-only node (from a client), without first going through the read-write node. In some embodiments, the client-side driver in the read-write node may be configured to notify these other read-only nodes (e.g., to a client-side driver of those other nodes) about changes by sending change notifications (e.g., changes to system metadata, such as a data dictionary or active transactions list, updates and/or invalidations to data pages, such as those data pages cached locally at the read-only node, consistency point indications, updates to distribute storage service metadata, and/or updates to storage metadata). In response, the read-only node may be configured to perform the notified changes (e.g., such as by invalidating their caches for a specific page or record of the cache or the whole cache, by modifying internal data structures, by updating or modifying values stored within data pages in the database cache maintained at the read-only node, and/or updating storage metadata maintained at the read-only node).

Groups of changes may be associated with a particular system transaction (sometimes referred to as a mini-transaction). One of the change notifications sent to the read-only node may be notified as the last change to be applied for a respective system transaction (e.g., a consistent page LSN (CPL)). However, more generally a consistency point indication may be sent to read-only nodes as change notification or separate indication. For example, in some embodiments a consistency point indication may be a CPL associated with a system transaction or may be another sequence indicator that signifies to a read-only node when to make certain changes visible to clients and/or process read requests based on the sent changes. If, for example, a consistency point is sent from a read-write node to a read-only node, it may indicate that any changes sent before the consistency point may not be applied (e.g., storage metadata updates) until all changes up to the consistency point are applied. As a result of consistency point indications, for reads requests, the read-only nodes may be configured to determine a consistent state of the database to present when servicing a read request, such as based on the consistency point received. The read request may then be serviced according to the determined consistent state of the database to be presented. For example, in some embodiments, data pages in a database cache on the read-only node may have been invalidated, and the consistent state of the database to be presented may cause the read-only node to retrieve updated copies of updated data pages (or log records of changes to those pages to apply them to the cache) from the storage layer. In some embodiments, the read-only nodes may be configured to receive an indication (e.g., a manifest) of data pages stored in the cache of the database engine head node, which may include pages that are hot on the read and write side. The read-only nodes may be configured to retrieve the hot pages from the storage layer, which may help prepare a read-only node to convert to a read-write node (e.g., if the read-write node fails). In addition, the read-only node may be configured to update an in-memory data structure (e.g., a transaction table) to determine which redo and undo records were inflight (e.g., not received or known by the read-only node) at the time of the read-write node failure. As a result, the converted read-only node may already have a warm cache (e.g., the cache may not have to be rebuilt from scratch) as part of the conversion process.

In some embodiments, the client-side driver(s) running on the read-write node and/or the read-only nodes may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (of the read-write node and/or read-only nodes) may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page (e.g., based on storage metadata for the distributed storage system), and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the read-write node cache and/or the by the cache of a particular read-only node. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
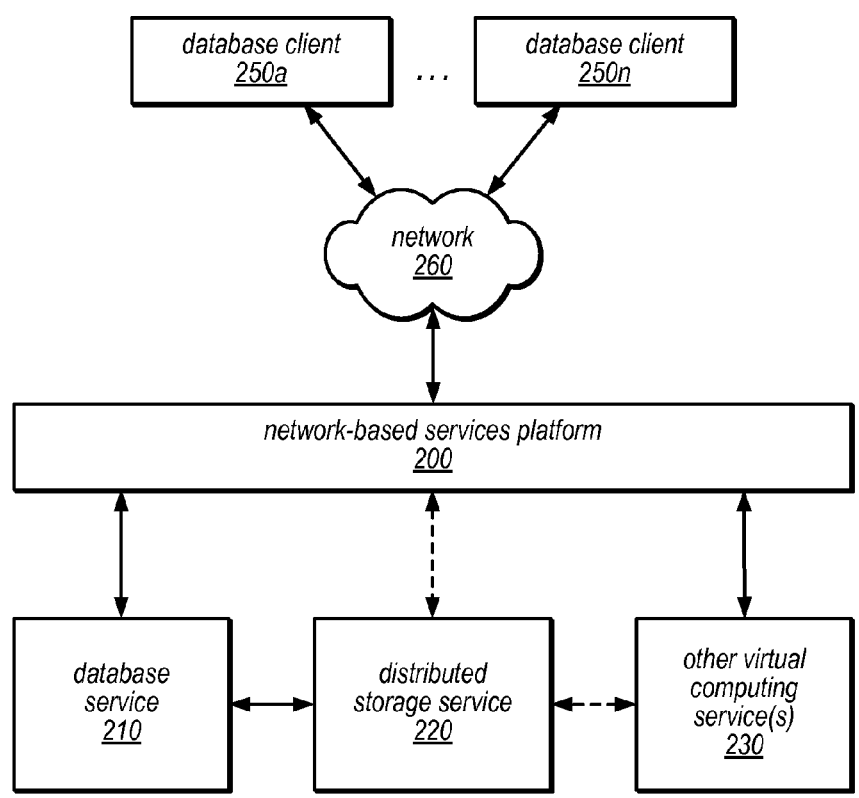
FIG. 2 is a block diagram illustrating a service system architecture that may be configured to implement a network-based database service that implements read-only nodes, according to some embodiments.

One embodiment of a service system architecture that may be configured to implement a web services-based database service is illustrated in FIG. 2. In the illustrated embodiment, a number of clients (shown as database clients 250*a*-250*n*) may be configured to interact with a network-based services platform 200 via a network 260. Network-based services platform 200 may be configured to interface with one or more instances of a database service 210 (an instance may include a read-write node and a number of read-only nodes), a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style web services architecture, a document- or message-based network-based services architecture, or another suitable network-based services architecture.

In some embodiments, a client 250 (e.g., a database service client) may be configured to provide access to network-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to network-based services platform 200 may be coordinated by client 250 and the operating system or file system on behalf of applications executing within the operating system environment.

Clients 250 may convey network-based services requests to and receive responses from network-based services platform 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, network-based service platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Network-based services platform 200 may also implement financial accounting and billing systems, or may maintain a database of usage data that may be queried and processed by external systems for reporting and billing of client usage activity. In certain embodiments, network-based services platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database table, network-based services platform 200 may be configured to ascertain whether the client 250 associated with the request is authorized to access the particular database table. Network-based services platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing database tables on behalf of clients 250 may be transparent to those clients. In other embodiments, distributed storage service 220 may be exposed to clients 250 through network-based services platform 200 to provide storage of database tables or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
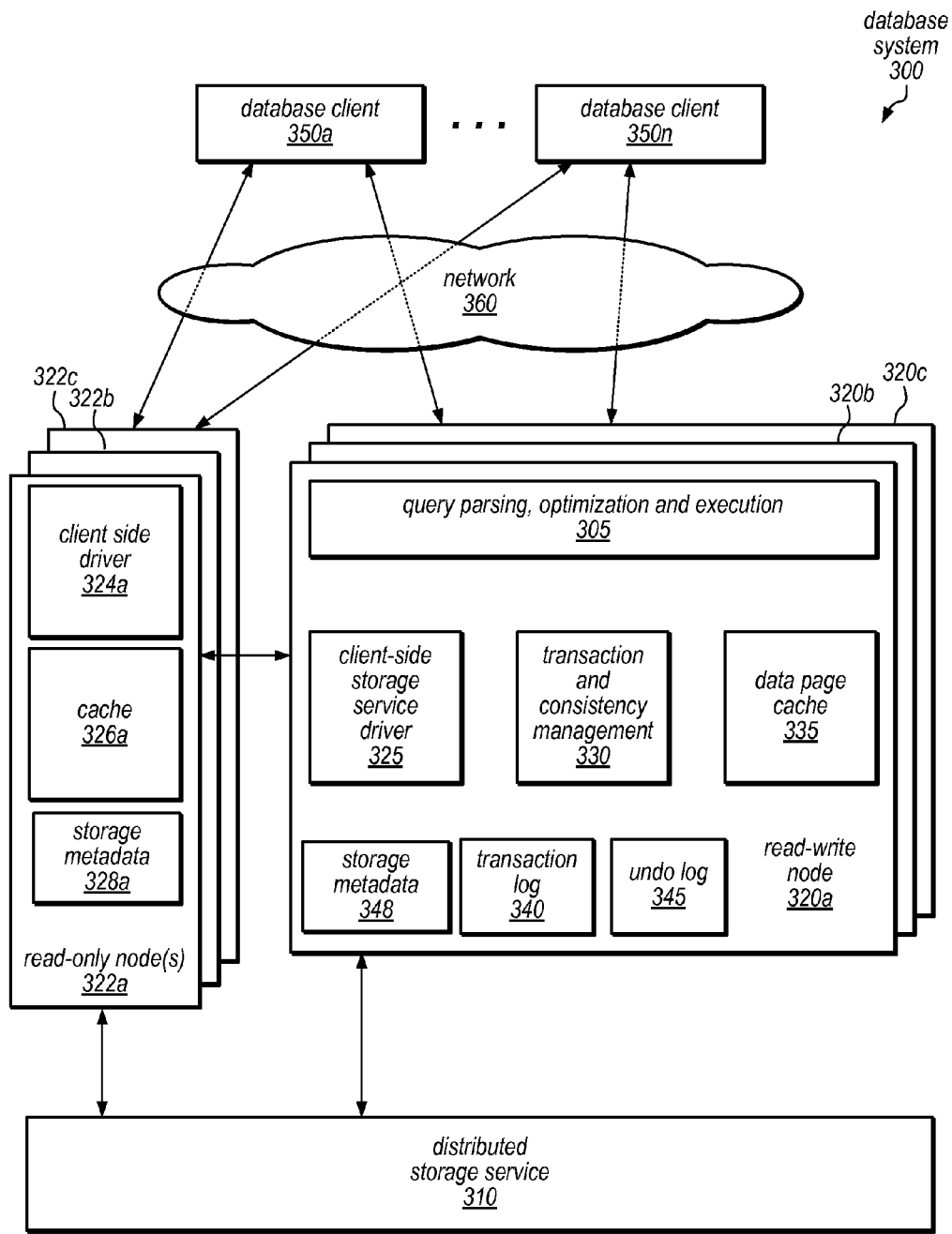
FIG. 3 is a block diagram illustrating various components of a database system configured to use the disclosed read-only nodes, according to some embodiments.

FIG. 3 is a block diagram illustrating various components of a database system that includes a read-write node, read-only nodes, and a separate distributed database storage service, according to one embodiment. In this example, database system 300 includes a respective database read-write node 320 and a plurality of read-only nodes 322a, 322b, and 322c for each of several database tables and a distributed storage service 310 (which may or may not be visible to the clients of the database system, shown as database clients 350a-350n). As illustrated in this example, one or more of database clients 350a-350n may access a read-write node 320 (e.g., read-write node 320a, read-write node 320b, or read-write node 320c, each of which is a component of a respective database instance) and/or a read-only node (e.g., read-only node 322a, 322b, or 322c) via network 360 (e.g., these components may be network-addressable and accessible to the database clients 350a-350n). Note that any number of read-only nodes may be associated with a particular database instance but for ease of illustration and explanation, three read-only nodes are shown in FIG. 3. Distributed storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, and/or space management operations in a manner that is invisible to storage clients 350a-350n.

As previously noted, each database instance may include a single read-write node 320 that receives requests from various client programs (e.g., applications) and/or subscribers (users), then parses them, optimizes them, and develops an execution plan to carry out the associated database operation(s). Also as previously noted, each read-only node may receive read requests (e.g., from various client programs, subscribers, and/or from the read-only node), and may similarly parse such requests, optimize them, and develop an execution plan to carry out the read (e.g., SELECT). In the example illustrated in FIG. 3, a query parsing, optimization, and execution component 305 of read-write node 320a may perform these functions for queries that are received from database client 350a and that target the database instance of which read-write node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, read-write node 320a may also include a client-side storage service driver 325, which may route read requests and/or change notifications (e.g., redo log records) to a read-only node and/or various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). In some embodiments, client-side storage driver 325 may have access to storage metadata 348. Storage metadata 348 may provide an access scheme for obtaining or writing to distributed storage service 310 (e.g., mapping information to one or more components within distributed storage service 310 storing data for database system 300). When routing read or write requests to distributed storage service 310, client-side storage driver 348 may access storage metadata to determine the particular storage nodes to send read or write requests requests to.

In this example, read-write node 320a includes data page cache 335, in which data pages that were recently accessed (read and/or write) may be temporarily held. As illustrated in FIG. 3, read-write node 320a may also include transaction and consistency management component 330, which may be responsible for providing transactionality and consistency in the database instance of which read-write node 320a is a component. For example, this component may be responsible for ensuring the Atomicity, Consistency, and Isolation properties of the database instance and the transactions that are directed that the database instance. As illustrated in FIG. 3, read-write node 320a may also include transaction log 340 and undo log 345, which may be employed by transaction and consistency management component 330 to track the status of various transactions and roll back any locally cached results of transactions that do not commit. Read-write node 320a may also maintain one or more in-memory data structures, such as a data dictionary, active transactions information, or any other information for describing the data structure or schema of the database. Other components, such as query parsing, optimization, and execution 305, transaction and consistency management 330, and client-side storage service driver 325, may access storage metadata 348 in order to process queries, generate change notification messages, and/or any other system functions.

Note that each of the other read-write nodes 320 illustrated in FIG. 3 (e.g., 320b and 320c) may include similar components and may perform similar functions for queries received by one or more of database clients 350a-350n and directed to the respective database instances of which it is a component.

In various embodiments, each of the read-only nodes 322a, 322b, and 322c may also include components similar to those of the read-write node and/or may be configured to include such components (e.g., upon conversion of a read-only to a read-write node to replace the old read-write node). As shown, each read-only node may include cache 326a and client side driver 324a. Client side driver 324a may be similar to client-side storage service driver 325 of the read-write node. Moreover, communication between the read-write node and the read-only nodes may be communication between client side driver 324a and client-side storage service driver 325. In some embodiments, client-side storage driver 324*a* may have access to a version of storage metadata 328*a* maintained at read-only node 322*a*. Storage metadata 328*a* may provide an access scheme for obtaining data from distributed storage service 310 (e.g., mapping information to one or more components within distributed storage service 310 storing data for database system 300). When routing read requests to distributed storage service 310, client-side storage driver 324*a* may access storage metadata 328*a* to determine the particular storage nodes to send read requests to. Cache 326*a* may be similar to data page cache 335 in that it may be configured to store recently accessed data pages. Note that data pages stored in the cache of one read-only node may be different than data pages stored in the cache of another read-only node which may also be different than data pages stored in data page cache 335. Moreover, the actual data stored for a data page in the cache of one read-only node may be different from the actual data stored for the same data page in the cache another read-only node and/or from the actual data for the same data page stored in data page cache 335.

In some embodiments, upon sending a redo log (or undo log) to the storage layer, client-side storage service driver 325 may also be configured to send one or more change notifications to client-side driver 324*a* at read-only node(s) 322*a*. Change notifications may be indicate various updates or changes made at read-write node. For example, inserting a new record in a database table may include many different changes, such as allocating new space in a data page for the new record, updating the indexing structure (e.g., a b-tree) of the database, storing the new data values for the record, and updating system metadata (e.g., the data dictionary) to include information about the new record may each have one or more change notifications to describe the performance of these changes. Different change notification messages may indicate different types of changes that are performed at a read-write node. Change notifications may include invalidation messages, which may indicate one or more data pages that may have modified data values. Change notifications may also include new data values, changes, or pages themselves for modified/updated data pages. Change notifications may also include changes to system metadata, such as data that indicates the definition and/or layout of data in distributed storage service 310 (e.g., data dictionary), or in-flight transaction information, such as the transaction state and/or active transaction list, for transactions performed at the read-write node. Change notifications may also indicate an update to storage metadata 328*a*.

Change notifications may be associated with a system transaction, in at least some embodiments. Multiple system transactions may be performed to complete a user update or request. For a given system transaction, client-side storage service driver 325 may be configured to identify a particular one of the change notifications as the last change to be applied of the given system transaction. A special identifier, number, or other marker may be included in the change notification to identify the last change, which client side driver 324*a* may be configured to identify. When responding to read requests, read-only node(s) 322*a* may be configured to determine the consistent state of the database to present when servicing the read request based, at least in part, on the identified last change of system transactions. This last change identifier may be a consistency point, indicating that when the change is applied there is a consistent view of the database, in some embodiments.

In various embodiments, one of read-only nodes 322*a*, 322*b*, or 322*c* may be converted into a new read-write node (e.g., if the read-write node 320*a* fails). To help prepare for such a conversion, one or more of the read-only nodes may be configured to receive, from the read-write node (while still active), an indication of the data pages stored in the read-write node's cache. The indication may be a manifest of data pages that are hot on the read and write side. The read-only nodes may then retrieve versions of those data pages, for example, from distributed storage service 310, and may store those retrieved data pages in cache. The manifest/indication may be sent periodically (e.g., hourly, daily, etc.) or upon certain events (e.g., every read/write, every 10 read/writes, upon some internal read-write node logic indicating potential read-write node failover, etc.). As such, the read-only nodes' caches may be a warmer cache in the event of a conversion to read-write node. In one embodiment, network-based service platform 200 may determine that a read-write node has failed and select which read-only node to convert. In other embodiments, the first read-only node to detect the read-write node's failure may determine that it should convert into a read-write node or the read-only node may vote for which read-only node to convert. In yet another embodiment, a given one of the read-only nodes may be preselected as the first option to convert into a read-write node if the previous read-write node fails. Other ways to determine which read-only node to convert also exist. In some embodiments, no loss of data may occur in the conversion process because the read-only node is connected to the same data storage as written to by the read-write node, and therefore has access to all of its data. Moreover, sending the change notifications between the read-write node and the read-only nodes may, in various embodiments, allow the read-only nodes to provide consistent views of the database with little or no lag time to catch-up to changes already performed at the read-write node. This is in contrast to a system in which the read-only nodes utilize a different data storage that is separate than that written to by the read-write node. In such a system using different data storage, data loss may occur if the replication was performed asynchronously or poor performance may occur if the replication was performed synchronously.

Moreover, there may exist log records (e.g., redo and/or undo) corresponding to transactions that were inflight to the read-only nodes from the previous read-write node that were unknown (e.g., not seen, not received) to the read-only nodes but were received by distributed storage service 310. Therefore, even if the manifest helps keep the read replicas' respective caches somewhat up to date, they may nevertheless still be stale in some respect. Therefore, in one embodiment, the read-only node that is converted into the new read-write node may (before or after conversion) be configured to determine which was the last log record (e.g., as identified by a monotonically increasing identifier, such as a log sequence number (LSN)) that the read-only node was aware of. The read-only node may then be configured to request which data records having corresponding log records later than the last log record have changed and invalidate those in cache. The read-only node may also be configured to request the actual log records and/or the data records to update its own cache so it is no longer invalid/stale. Further, the read-only nodes may be configured to maintain a transaction table of the inflight transactions. The read-only nodes may be configured to request distributed storage service 310 to send the inflight transactions to the read-only nodes and then update in memory structures (e.g., the transaction table) according to the inflight transactions. Alternatively, as noted above, change notifications may include changes to system metadata which indicate the in-flight transactions for the in-memory structures. The converted read-only node may be configured to determine that a particular transaction of the inflight transactions was related to the failure of the read-write node (e.g., caused it to crash) and roll back a change of that transaction (e.g., not apply it to its own cache and/or instruct the storage layer to remove its application at the storage layer).

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Log Sequence Number, which may be an identifier that uses monotonically increasing values to denote an ordering. For example LSN 1 is earlier than LSN 3, which is earlier than LSN6. Note that each number in sequence need not be used. For example, LSNs 1, 2, 3, 4, and 6 may exist but not LSN 5 in some embodiments. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
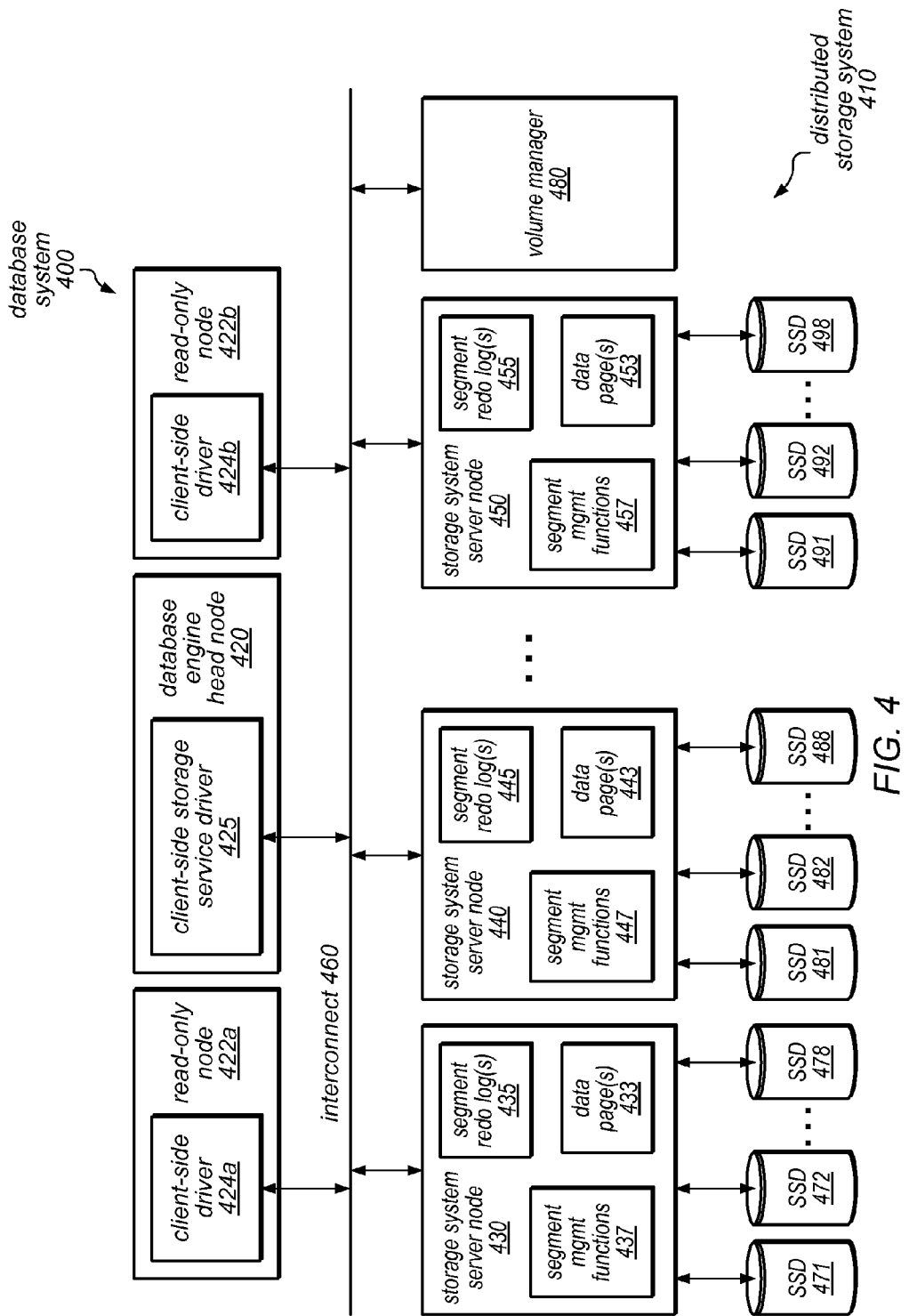
FIG. 4 is a block diagram illustrating a distributed storage system configured to use the disclosed read-only nodes, according to some embodiments.

One embodiment of a distributed storage system is illustrated by the block diagram in FIG. 4. In this example, a database system 400 includes a distributed storage system 410, which communicates with a read-write node 420, read-only node 422a, and read-only node 422b (only two read-only nodes are shown for ease of illustration/explanation) over interconnect 460. As in the example illustrated in FIG. 3, read-write node 420 may include a client-side storage service driver 425 and read-only nodes 422a and 422b may each include a client-side driver 424a and 424b, respectively. In this example, distributed storage system 410 includes multiple storage system server nodes (including those shown as 430, 440, and 450), each of which includes storage for data pages, redo logs for the segment(s) it stores, system metadata for read-write node 420 (e.g., data dictionary data, transaction table data etc.) and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Distributed storage system 410 may also implement a volume manager 480. Volume manager 480 may be implemented as part of a control plane for distributed storage system 410. Implemented one or more servers or computing devices (such as computing system 1100 described below with regard to FIG. 11), volume manager 480 may provide various control functions as well as information to clients such as read-only nodes 422a and 422b, as well as read-write node 420. In at least some embodiments, client-side drivers 424a, 424b, and 425 may be configured to communicate with volume manager 480 according to one or more standard or customized protocols or APIs over interconnect 460. Similarly, volume manager 480 may be configured to communicate with storage system server nodes 430 through 450.

In at least some embodiments, volume manager 480 may be aware of or instigate changes to distributed storage system 410. For example, volume manager 480 may poll or sweep storage nodes to check the health or performance of storage nodes. For storage nodes that are unhealthy or not performing up to various standards or thresholds, volume manager 480 may assign new resources, such as additional storage nodes, to distribute storage system 410. If for instance a member of a protection group becomes unavailable, volume manager 480 may update a protection group policy for the protection group and notify group members that a new storage node may be part of the protection group.

Volume manager 480 may, in various embodiments, maintain storage metadata describing an access scheme for distributed storage system 410. For instance, volume manager 480 may maintain mapping information and/or an index of group members for one or more protection groups protecting different or the same data objects for database system 400. Volume manager 480 may report or notify group members of changes by sending out an incremented version number for the storage group policy (e.g., an epoch). Other systems or nodes, such as read-only nodes 422a, 422b, and database engine head node 420 may obtain the latest version of storage metadata for distributed storage system 410 from volume manager 480.

Figure 5:
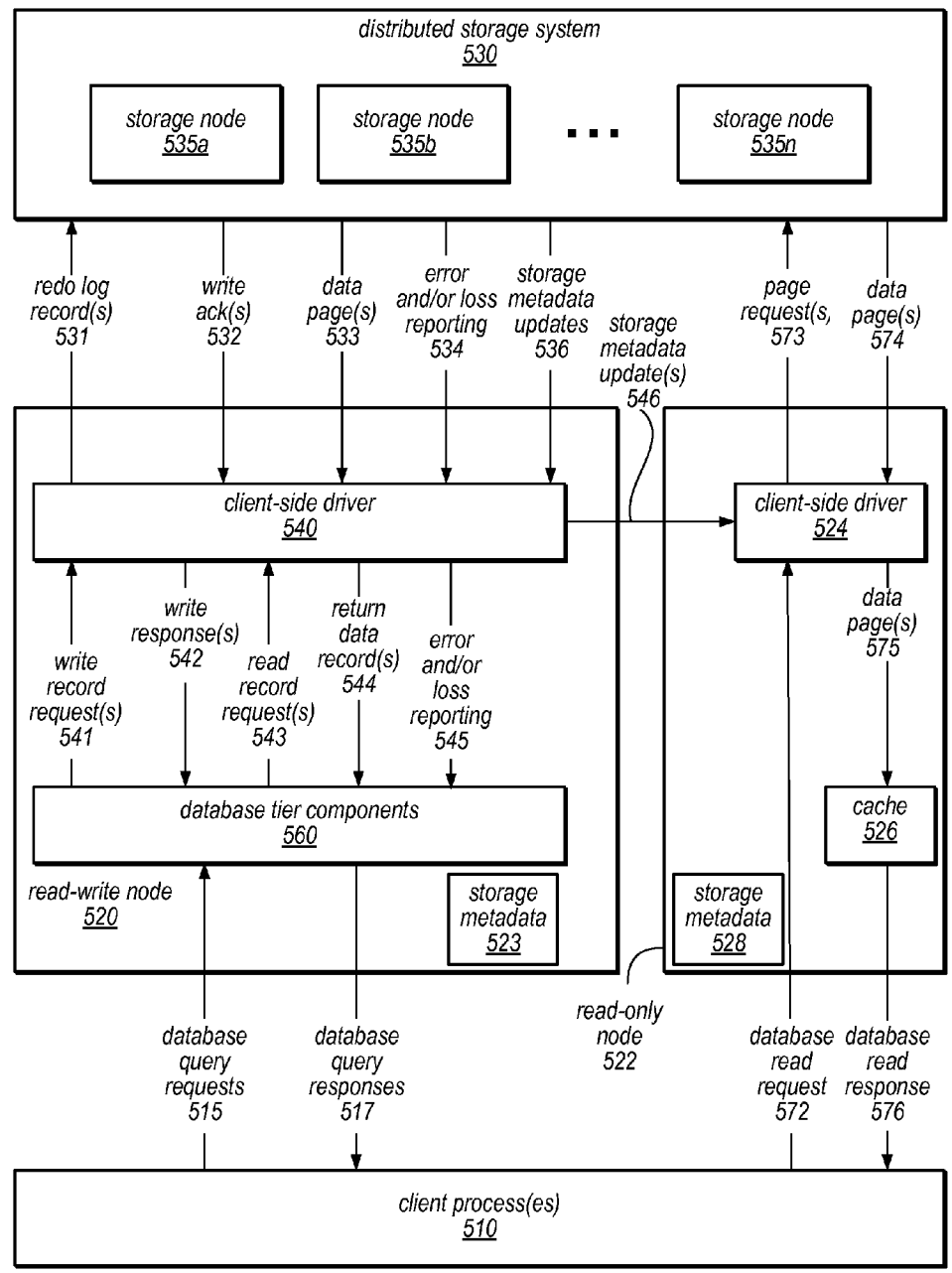
FIG. 5 is a block diagram illustrating the use of a separate distributed storage system in a database system configured to use the disclosed read-only nodes, according to some embodiments.

FIG. 5 is a block diagram illustrating the use of a separate distributed storage system in a database system, according to one embodiment. In this example, one or more client processes 510 may store data to one or more database tables maintained by a database system that includes a database engine 520 and a distributed storage system 530. In the example illustrated in FIG. 5, database engine 520 includes database tier components 560 and client-side driver 540 (which serves as the interface between distributed storage system 530, database tier components 560, and read-only node 522). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. In some embodiments, for write requests, client-side driver 540 may send change notifications (e.g., a notification of changes to data pages, such as the new data values themselves as indicated by the one or more redo log records 531 or cache invalidation messages, and/or changes to system metadata, such as data structures that indicate the layout and/or definition of the database and/or in-flight transaction data, such as the states of and entries of active transactions at read-write node 520) to client-side driver 524 of read-only node 522, which may in turn apply the changes, such as to cache 526 and system metadata 528. Distributed storage system 530 may return a corresponding write acknowledgement 532 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In some embodiments, distributed storage system 530 may send storage metadata updates 536 to client-side driver 540. Storage metadata updates 536 may be sent in response to write or read storage nodes 535 in distributed storage system that are out-of-date with a current version of storage metadata. For example, in some embodiments, each read or write request sent to storage nodes 535 may include a storage metadata version identifier (e.g., an epoch). If the storage metadata version identifier is not current with the storage metadata version identifier on the storage node, a storage metadata update 536 including the new storage metadata identifier may be sent to read-write node 520. In some embodiments, in response to receiving an indication of a new version of storage metadata, client-side driver 540 may contact a volume manager or some other component of distributed storage system 530 in order to receive the updated storage metadata 546. Read-write node 520 may then update storage metadata 523 at the read-write node and send the storage metadata updates 546 to client-side driver 524 of the read-only node 522 in order to update the storage metadata 528 maintained at the read-only node 522. Storage metadata updates may also be sent 546 to client side driver 528 which indicate which storage nodes 535 have acknowledged 532 and persist redo log records 531.

In this example, each database query request 515 that includes a request to read a data page may be parsed and optimized to generate one or more read record requests 543, which may be sent to clients-side driver 540 for subsequent routing to distributed storage system 530. In this example, client-side driver 540 may send these requests to specific ones of the storage nodes 535 of distributed storage system 530 based on storage metadata 523, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517. Note that certain read and write requests may be made to a cache (e.g., data page cache 335) of database engine, in addition to, or instead of being made to distributed storage system 530. As part of parsed and optimizing certain read requests, some, or all, of the read query plan may be passed to read-only node 522 for performing the read.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, client process(es) 510 may submit database read request 572 directly to read-only node 522 to query the database. For a request for non-stale cached data, read-only node may retrieve the requested data from cache 526 and return it to client process(es) as database read response 576. For a request for a data record that is present in cache 526 as stale data or for a data record that is not present in cache 526, client-side driver 524 may send page request(s) 573 to distributed storage system 530 based on storage metadata 528 and the requested data page(s) 574 may be returned to read-only node 522 and then provided to client process(es) 510 as database read response 576. In one embodiment, data page(s) 574 may be routed through client-side driver 524 of read-only node 522 and the data page(s) may be stored in cache 526 and replace the stale cached data or replace some other data that is determined as cold data (e.g., is accessed less frequently than other cached data).

Note that in various embodiments, the API calls and responses between database engine 520 and distributed storage system 530 (e.g., APIs 531-534) and/or the API calls and responses between client-side driver 540 and database tier components 560 (e.g., APIs 541-545) and/or API calls and responses between read-only node 522 and distributed storage system 530 (e.g., APIs 573-574) and/or API calls and responses between client-side driver 524 and cache 526 (e.g., APIs 575 and 547) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
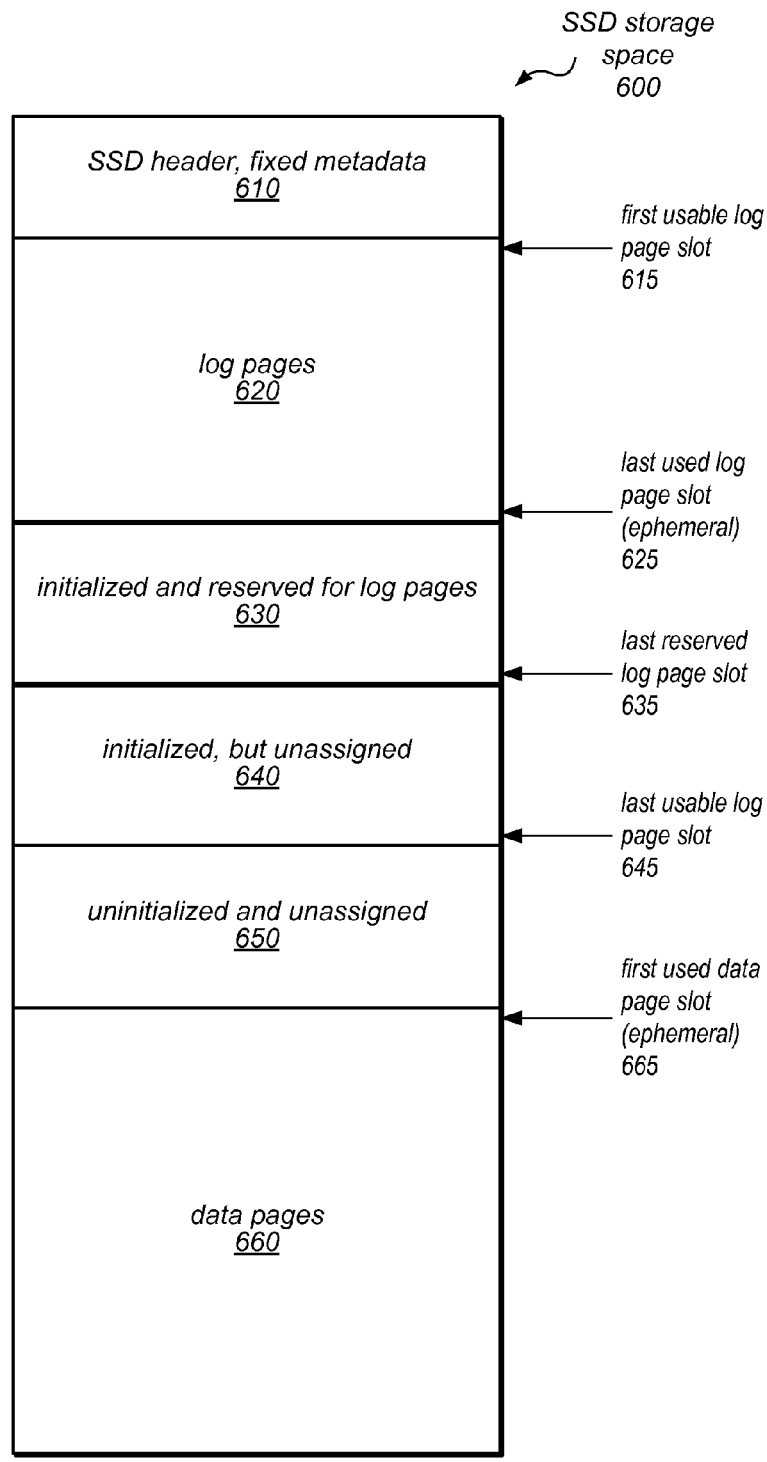
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640)

is initialized, but unassigned, and another portion of the space (shown as 650) is uninitialized and unassigned. Finally, the portion of SSD storage space 600 labeled 660 stores data pages.

In this example, the first usable log page slot is noted as 615, and the last used log page slot (ephemeral) is noted as 625. The last reserved log page slot is noted as 635, and the last usable log page slot is noted as 645. In this example, the first used data page slot (ephemeral) is noted as 665. In some embodiments, the positions of each of these elements (615, 625, 635, 645, and 665) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot (at 615) and the last reserved log page slot (625). In some embodiments, this pool may safely grow up to last usable log page slot (625) without re-initialization of new log page slots (e.g., by persisting an update to the pointer that identifies the last reserved log page slot, 635). In this example, beyond the last usable log page slot (which is identified by pointer 645), the pool may grow up to the first used data page slot (which is identified by pointer 665) by persisting initialized log page slots and persistently updating the pointer for the last usable log page slot (645). In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot (635).

In the example illustrated in FIG. 6, the current data page slot pool includes the area between the last usable log page slot (which is identified by pointer 645) and the end of SSD storage space 600. In some embodiments, the data page pool may be safely grown to the position identified by the pointer to the last reserved log page slot (635) by persisting an update to the pointer to the last usable log page slot (645). In this example, the previously initialized, but unassigned portion of the SSD storage space 600 shown as 640 may be pressed into service to store data pages. Beyond this, the pool may be safely grown to the position identified by the pointer to the last used log page slot (625) by persisting updates to the pointers for the last reserved log page slot (635) and the last usable log page slot (645), effectively reassigning the portions of SSD storage space 600 shown as 630 and 640 to store data pages, rather than log pages. In some embodiments, the data page slot pool may be safely shrunk down to the position identified by the pointer to the first used data page slot (665) by initializing additional log page slots and persisting an update to the pointer to the last usable log page slot (645).

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot (635) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and may preferentially garbage collect almost-empty data pages (which may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 7:
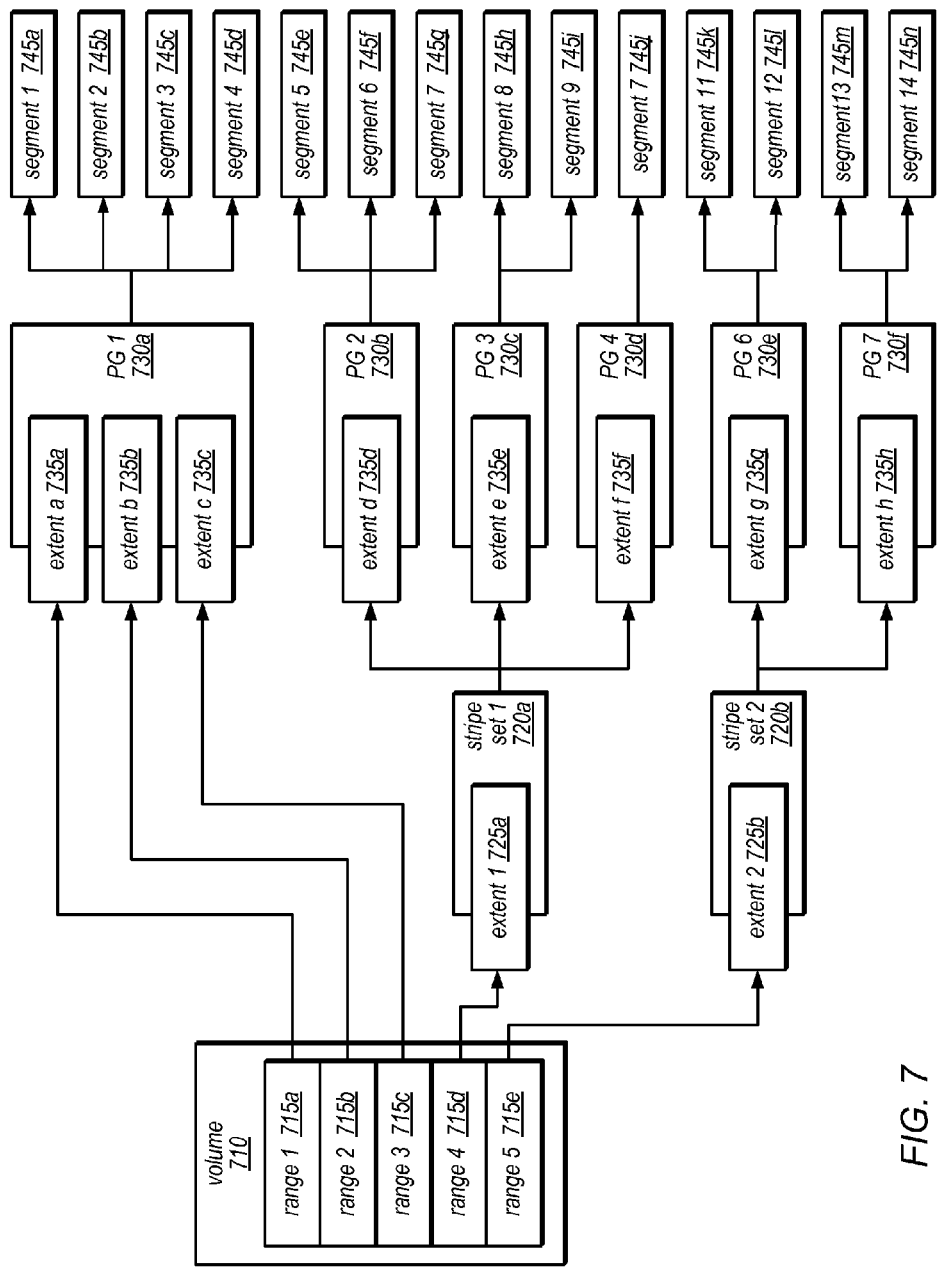
FIG. 7 is a block diagram illustrating an example configuration of a database volume, according to some embodiments.

FIG. 7 is a block diagram illustrating an example configuration of a database volume 710, according to one embodiment. In this example, data corresponding to each of various address ranges 715 (shown as address ranges 715a-715e) is stored as different segments 745 (shown as segments 745a-745n). More specifically, data corresponding to each of various address ranges 715 may be organized into different extents (shown as extents 725a-725b, and extents 735a-735h), and various ones of these extents may be included in different protection groups 730 (shown as 730a-730f), with or without striping (such as that shown as stripe set 720a and stripe set 720b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (720a) and stripe set 2 (720b) illustrates how extents (e.g., extents 725a and 725b) may be striped into a volume, in some embodiments.

More specifically, in this example, protection group 1 (730a) includes extents a-c (735a-735c), which include data from ranges 1-3 (715a-715c), respectively, and these extents are mapped to segments 1-4 (745a-745d). Protection group 2 (730b) includes extent d (735d), which includes data striped from range 4 (715d), and this extent is mapped to segments 5-7 (745e-745g). Similarly, protection group 3 (730c) includes extent e (735e), which includes data striped from range 4 (715d), and is mapped to segments 8-9 (745h-745i); and protection group 4 (730d) includes extent f (735f), which includes data striped from range 4 (715d), and is mapped to segment 10 (745j). In this example, protection group 6 (730e) includes extent g (735g), which includes data striped from range 5 (715e), and is mapped to segments 11-12 (745k-745l); and protection group 7 (730f) includes extent h (735h), which also includes data striped from range 5 (715e), and is mapped to segments 13-14 (745m-745n).

Figure 8:
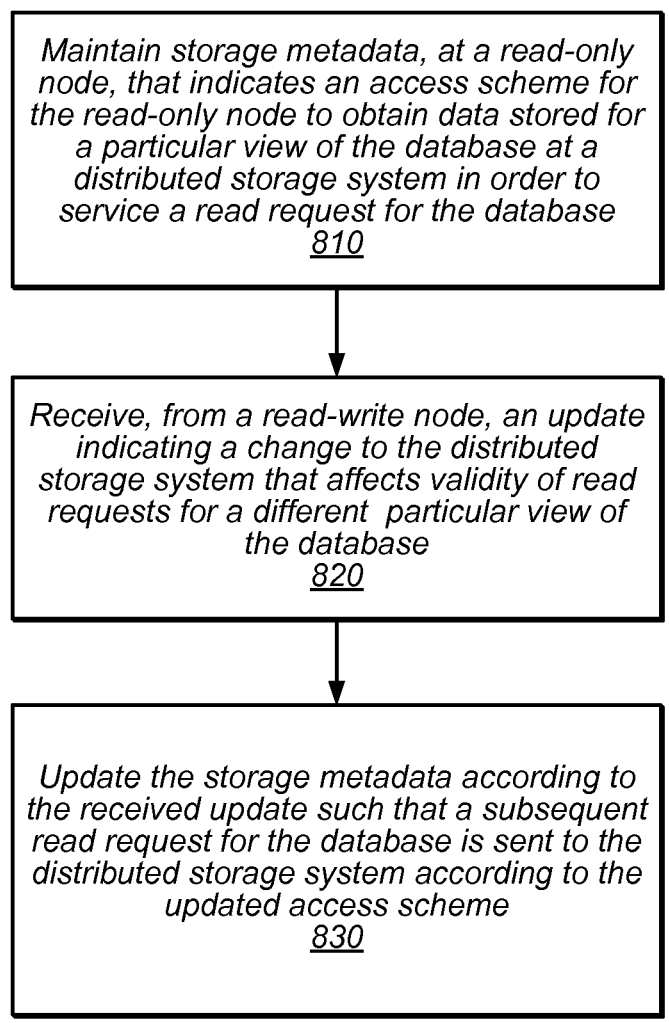
FIG. 8 is a high-level flowchart illustrating a method of efficiently replicating distributed storage changes for read-only nodes of distributed database system, according to some embodiments.

Various examples have been given above of a distributed database system configured to implement efficiently replicating distributed storage system changes for read-only nodes. While the different ones of the various components, modules, devices, nodes, or systems described above may be configured to replicate distributed storage changes, various other different devices may also be configured to implement efficiently replicating distributed storage changes for read-only nodes. FIG. 8 is a high-level flowchart illustrating a method of efficiently replicating distributed storage changes for read-only nodes of distributed database system, according to some embodiments, which may be implemented by the example distributed database systems described above or other database systems that implement read-only nodes.

As indicated at 810, in some embodiments, storage metadata may be maintained at a read-only node of distributed database system. Storage metadata may indicate an access scheme for the read-only node to obtain data stored for a particular view of the database at a distributed storage system in order to service read requests for the database. In some embodiments, the access scheme may include mapping information that identifies storage nodes that maintain data for a particular view of the database in a distributed storage system. For example, the storage metadata may indicate which storage nodes maintain redo log records up to a particular LSN. Storage metadata may also provide a listing of network addresses or endpoints to which read requests from the read-only node may be sent. Storage metadata may also include membership information for groups of storage nodes maintaining the data. For example, in some embodiments, a group of storage nodes may be a quorum set or a protection group, that maintains a replica of the data object according to a protection group policy. If updates to the data object are to be maintained, then they may be maintained according to the protection group policy (e.g., write quorum policy). Consider the scenario where the protection group policy indicates that each update to the data object must be maintained at a write quorum of group members of the protection group before the updated is considered durable (i.e. committed). Storage metadata may maintain information describing the protection group policy for the protection group, as well as the group members in the protection group that store a particular view of the database as part of the write quorum. Storage metadata may be maintained for multiple different protection groups (such as for different ranges of the volume as illustrated in FIG. 7) of storage nodes for multiple different portions of data that may be accessed via read requests from the read-only node.

In some embodiments, an update to the storage metadata may be received from a read-write node that indicates a change to the distributed storage system that affects validity of read requests for a different particular view of the database, as indicated at 820. In one example, storage metadata updates may identify a new view or version of data stored on storage nodes, such as the highest complete LSN stored at a storage node. In another example, if some storage nodes no longer receive updates to the data maintained for the distributed storage system, a read request directed to those storage nodes may no longer be valid as data returned may be stale. Similarly, read requests sent to storage nodes that return the read request as improper as a result of distributed storage system changes may also be invalid. Akin to the illustration discussed above with regard to FIG. 1, the change affecting validity may include an adding an additional storage node to be included in a group of nodes (e.g., a protection group) or identifying a storage node that may no longer be a part of group (as also illustrated in FIG. 1). In some embodiments, mapping information that eliminates, deletes, or removes a storage node from the group may be received. For example, the size of group of storage nodes may be changed per a change in a storage system client's durability policy (one that requires less storage nodes). Consider the scenario where a group of storage nodes implements a protection group that requires 3 out of 5 storage nodes maintain an update to the data in order to satisfy a write quorum for the update. If the durability policy for the storage group changes, the number of storage nodes in the protection group may be lowered to 3 storage nodes, and the write quorum policy change to 2 out of 3. In some embodiments, the additional storage metadata may include a storage metadata version indicator (e.g., an epoch) which identifies the current version of the storage metadata maintained at the read-write node and in the distributed storage system.

The storage metadata may then be updated according to the received update, as indicated at 830. In some embodiments the update may be applied such that a subsequent read request for the different particular view of the database may be sent to the distributed storage system according to the updated access scheme. For example, if the subsequent read request is associated with a particular LSN, the read-only node may identify a storage node that stores log records up to that particular LSN so that the read request may be serviced. In some embodiments, the read request may sent to a new storage node in a group of storage nodes as indicated in the updated access scheme of the storage metadata. Likewise, if a storage node is removed or no longer available for servicing particular views of the database (e.g., does not maintain the log records up to a particular LSN), then the updated access scheme of the storage metadata may indicate that read requests are not to be sent to the storage node.

In at least some embodiments, updates to storage metadata may be applied in response to receiving a consistency point from the read-write node. A consistency point may identify a particular view of the database to be exposed to clients when servicing read requests. The consistency point may advance the read-only node to a particular point in time or view of the database (e.g., to a higher LSN). Read requests may also be processed according to which storage nodes in a distributed storage system are complete up to the consistency point.

The method for maintaining storage metadata, receiving updates to the storage metadata, and updating the storage metadata may be performed for different groups of storage nodes (e.g., protection groups) for different portions of data stored for the database. In at least some embodiments, the read-only node may service read requests for different portions of the data stored for the database, such ranges of a volume (as illustrated in FIG. 7). Storage metadata affecting the validity of read requests for each of the different portions may be received and the storage metadata may be updated accordingly.

Figure 9:
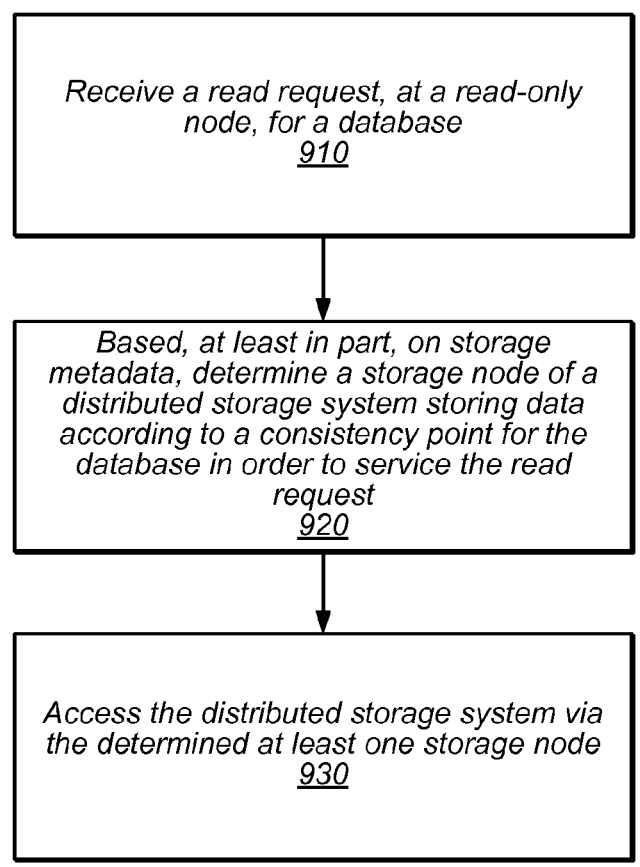
FIG. 9 is a high-level flowchart illustrating a method of processing read requests at a read-only node implementing efficient replication of distributed storage changes, according to some embodiments.

FIG. 9 is a high-level flowchart illustrating a method of processing read requests at a read-only node implementing efficient replication of distributed storage changes, according to some embodiments. As indicated at 910, a read request may be received, at a read-only node, for the database. In some embodiments, a read request may be associated with a particular view or version of the database. For example, if data for the database is stored as part of log structured storage in the distributed storage system, then the read request may be associated with a particular point in the sequence of log records for the database (e.g., an LSN).

As indicated at 920, a storage node of a distributed storage system storing data for the database in order to service the read request may be determined. This determination may be made based, at least in part, on the storage metadata, in various embodiments, which indicates that the storage node stores data according to a consistency point (such as the consistency point discussed above. For example, the storage metadata may maintain a listing of which storage nodes maintain log records up to a certain LSN. When determining a storage node for servicing the read request, the consistency point of the read-only node (such as described above) may be used as a threshold or minimum point at which a storage node must maintain log records in order to service the read request. If, for instance, the consistency point is LSN 1000, and the read request is associated with LSN 1000, then the read-only node may evaluate the storage metadata to identify which storage node maintains log records at least up to (or as of) LSN 1000.

This previous example, is one of many ways in which Part of the determination of a storage node to send a read request to may be based on the view or version of the data object associated with the read request. In another example, the access scheme indicated in the storage metadata may include mapping information identifying storage nodes that may only maintain select views of the database. Older views, for instance, may be maintained on only some storage nodes. Therefore, if the read request is for one of those older views, then the mapping information of the storage metadata may be used to determine one or more of the storage nodes storing the older view to direct the read request to. For example, if the storage nodes maintaining the data are a protection group with a protection group policy that requires a write quorum to be achieved for every write, then the mapping information in the storage metadata may be used to determine which storage nodes may service a read request based on which storage nodes are members of the write quorum for the particular view of the database.

A consistency point, in at least some embodiments, may be associated with a view of a database before or after a system transaction. A system transaction may be perceived from the perspective of the client requesting the database update as an atomic operation, unlike a user transaction which a user may have to specify that the transaction commit only if all of the transaction steps are performed. Using the above example, a system transaction may be the operation to insert a new record into the database table. Performed as a system transaction, the new record may thus be either inserted, or not, in the database table. Although the system transaction may appear atomic to a client, performing the system transaction may include multiple changes. If, for instance, a b-tree structure is used by distributed database to index data, multiple changes may be made to the b-tree structure (e.g., add a new leaf node, split a parent node, create a new root node, etc.), as well as changes to one or more data objects, such as data pages, which may be used to store data values for the new record. In at least some embodiments, changes may be made to storage metadata as a result of the system transaction. For example, write requests sent to the distributed storage system may return error messages with new storage metadata. The write requests may be then sent to one or more different storage nodes. The read-only node may need to be made aware of the different storage nodes to which the write requests associated with this system transaction have been sent. Thus, the storage metadata update may be sent and applied at the read-only node when the consistency point indication has also been received and applied (matching the applied system transaction with updated mapping information to the storage nodes which applied the system transaction's changes to the data object).

As indicated at 930, the read-only nodes may send or direct read requests to the determined storage nodes in order to access the distributed storage via the determined storage nodes, in various embodiments. The read request may be sent to a quorum of storage nodes, or, in some embodiments, the read request may be sent to a single storage node which the storage metadata identifies as maintaining the version of the data object associated with the read request.

Figure 10:
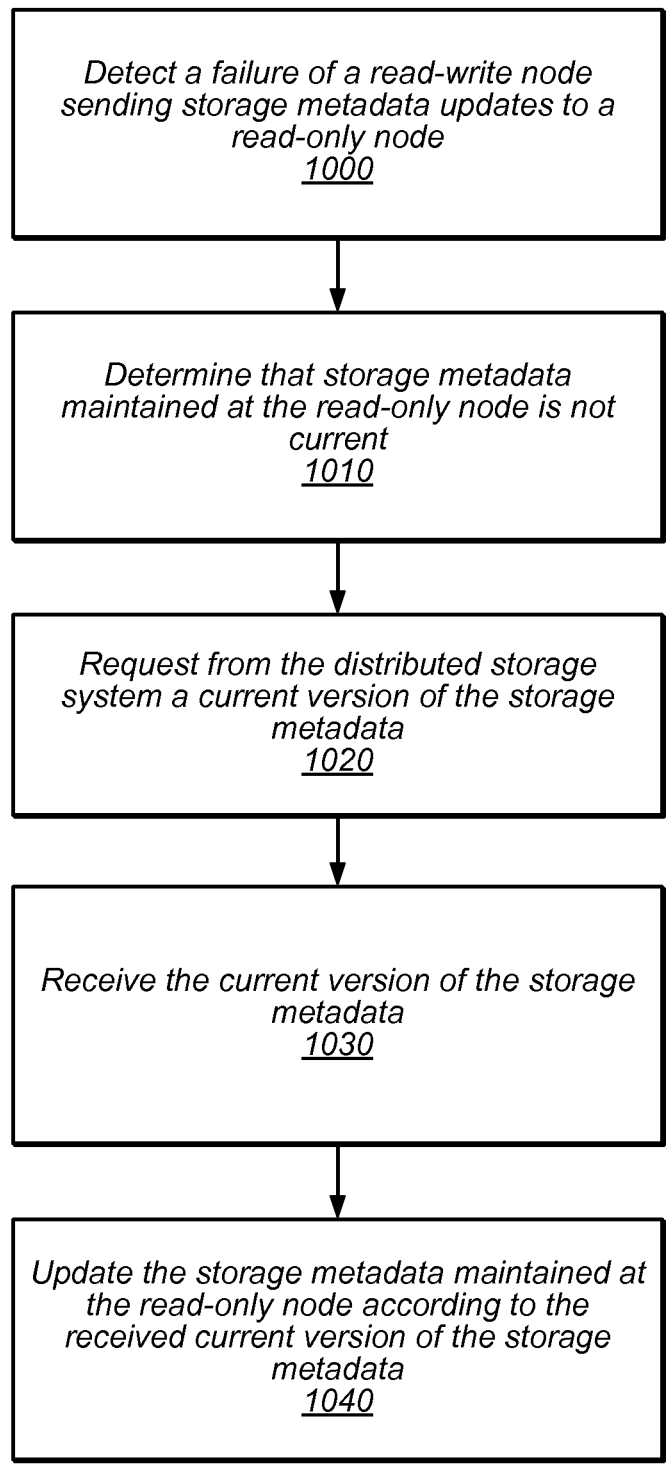
FIG. 10 is a high-level flowchart illustrating a method for receiving a current version of storage metadata from a distributed storage system, according to some embodiments.

A read-only node may be kept aware of changes to storage metadata by receiving updates from a read-write node that indicate changes to the storage metadata changes. However, sometimes the read-write node may fail to send storage metadata updates. For example, the read-write node may become overburdened, unavailable, or even may momentarily crash or suffer some other kind of failure. Similarly, the read-only node may crash, become overloaded, or otherwise unavailable to receive storage metadata updates. In some embodiments, a read-only node may proactively update its own storage metadata. FIG. 10 is a high-level flowchart illustrating a method for receiving a current version of storage metadata from a distributed storage system, according to some embodiments.

As indicated at 1000, a failure of the read-write node sending storage metadata updates to a read-only node may be detected. In some embodiments, a read-write node failure (or other unavailability due to workload) may be detected in order to determine that the storage metadata is not current. The read-only node may also fail and recover, causing the read-only node to determine that the storage metadata is not current, in some embodiments.

As indicated at 1010, it may be determined that storage metadata maintained at a read-only node for a data object is not current. This may be performed in response to detecting the failure described above with regard to element 1000, or, in some embodiments, without detecting a failure of the read-write node or recovering failure at the read-only node. Alternative ways to determine that the storage metadata is not current may include, for example, a read-only node may receive an error message or other indication from a storage node to which it directed a read request that the storage metadata version identifier included in the read request is out of date. Alternatively, a validity period or expiration time may have passed without receiving a storage metadata update from the read-write node. In response to determining that the storage metadata is not current, a current version of the storage metadata for the data object may be requested from the distributed storage system, as indicated in 1020. A request message for current storage metadata may be directed to a storage node or some distributed storage system manager module or node, such as volume manager 480 described above with regard to FIG. 4. The current version of the storage metadata for the data object may then be received, as indicated at 1030. And, similar to element 830 described above in FIG. 8, the storage metadata maintained at the read-only node may be updated according to the received current version of the storage metadata, as indicated at 1040.

In some embodiments, a read-only node performing the method illustrated in FIG. 10 may be promoted to a read-write node, performing both read and write operations for the distributed database system. In some embodiments, the read-only node may also establish a connection with the same or a new read-write node after detecting the failure of the read-write node in order to receive new storage metadata updates in addition to the version of storage metadata maintained at the distributed storage system.

The methods described herein (e.g., the methods of FIGS. 8-10) may, in various embodiments, be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Figure 11:
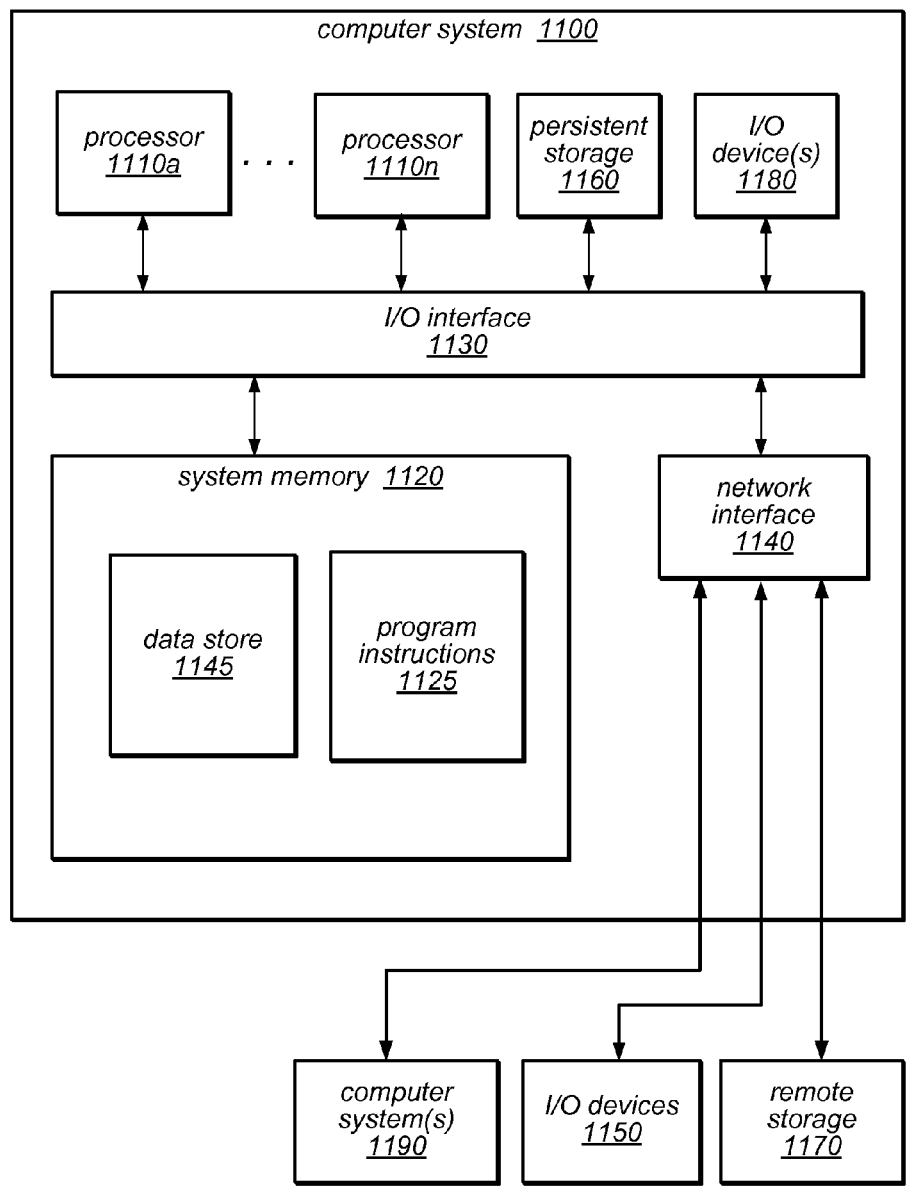
FIG. 11 is a block diagram illustrating an example computer system, according to various embodiments.

FIG. 11 is a block diagram illustrating a computer system configured to implement at least a portion of the database systems described herein, according to various embodiments. For example, computer system 1100 may be configured to implement a read-write (or master/leader/primary) node of a database tier, a read-only node (or read replica), or one of a plurality of storage nodes of a separate distributed storage system that stores database tables and associated metadata on behalf of clients of the database tier, in various embodiments. Computer system 1100 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1100 includes one or more processors 1110 (any of which may include multiple cores, which may be single or multi-threaded) coupled to a system memory 1120 via an input/output (I/O) interface 1130. Computer system 1100 further includes a network interface 1140 coupled to I/O interface 1130. In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. The computer system 1100 also includes one or more network communication devices (e.g., network interface 1140) for communicating with other systems and/or components over a communications network (e.g. Internet, LAN, etc.). For example, a client application executing on system 1100 may use network interface 1140 to communicate with a server application executing on a single server or on a cluster of servers that implement one or more of the components of the database systems described herein. In another example, an instance of a server application executing on computer system 1100 may use network interface 1140 to communicate with other instances of the server application (or another server application) that may be implemented on other computer systems (e.g., computer systems 1190).

In the illustrated embodiment, computer system 1100 also includes one or more persistent storage devices 1160 and/or one or more I/O devices 1180. In various embodiments, persistent storage devices 1160 may correspond to disk drives, tape drives, solid state memory, other mass storage devices, or any other persistent storage device. Computer system 1100 (or a distributed application or operating system operating thereon) may store instructions and/or data in persistent storage devices 1160, as desired, and may retrieve the stored instruction and/or data as needed. For example, in some embodiments, computer system 1100 may host a storage system server node, and persistent storage 1160 may include the SSDs attached to that server node.

Computer system 1100 includes one or more system memories 1120 that are configured to store instructions and data accessible by processor(s) 1110. In various embodiments, system memories 1120 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1120 may contain program instructions 1125 that are executable by processor(s) 1110 to implement the methods and techniques described herein. In various embodiments, program instructions 1125 may be encoded in platform native binary, any interpreted language such as Java™ byte-code, or in any other language such as C/C++, Java™, etc., or in any combination thereof. For example, in the illustrated embodiment, program instructions 1125 include program instructions executable to implement the functionality of a read-write node of a database tier, one of a plurality of read-only nodes, or one of a plurality of storage nodes of a separate distributed storage system that stores database tables and associated metadata on behalf of clients of the database tier, in various embodiments. In some embodiments, program instructions 1125 may implement multiple separate clients, server nodes, and/or other components.

In some embodiments, program instructions 1125 may include instructions executable to implement an operating system (not shown), which may be any of various operating systems, such as UNIX, LINUX, Solaris™, MacOS™, Windows™, etc. Any or all of program instructions 1125 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1140.

In some embodiments, system memory 1120 may include data store 1145, which may be configured as described herein. For example, the information described herein as being stored by the database tier (e.g., on a primary node), such as a transaction log, an undo log, cached page data, or other information used in performing the functions of the database tiers described herein may be stored in data store 1145 or in another portion of system memory 1120 on one or more nodes, in persistent storage 1160, and/or on one or more remote storage devices 1170, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1145 or in another portion of system memory 1120 on one or more nodes, in persistent storage 1160, and/or on one or more remote storage devices 1170, at different times and in various embodiments. Similarly, the information described herein as being stored by the storage tier (e.g., redo log records, data pages, data records, and/or other information used in performing the functions of the distributed storage systems described herein) may be stored in data store 1145 or in another portion of system memory 1120 on one or more nodes, in persistent storage 1160, and/or on one or more remote storage devices 1170, at different times and in various embodiments. In general, system memory 1120 (e.g., data store 1145 within system memory 1120), persistent storage 1160, and/or remote storage 1170 may store data blocks, replicas of data blocks, metadata associated with data blocks and/or their state, database configuration information, and/or any other information usable in implementing the methods and techniques described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example.

Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems 1190 (which may implement one or more storage system server nodes, primary nodes, read-only node nodes, and/or clients of the database systems described herein), for example. In addition, network interface 1140 may be configured to allow communication between computer system 1100 and various I/O devices 1150 and/or remote storage 1170. Input/output devices 1150 may, in some embodiments, include one or more display terminals, keyboards, keypads, touchpads, scanning devices, voice or optical recognition devices, or any other devices suitable for entering or retrieving data by one or more computer systems 1100. Multiple input/output devices 1150 may be present in computer system 1100 or may be distributed on various nodes of a distributed system that includes computer system 1100. In some embodiments, similar input/output devices may be separate from computer system 1100 and may interact with one or more nodes of a distributed system that includes computer system 1100 through a wired or wireless connection, such as over network interface 1140. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol. In various embodiments, computer system 1100 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices each comprising at least one respective hardware processor and memory and configured to implement a plurality of nodes of a distributed database;
one or more nodes of the plurality of nodes is configured to implement one or more read-only nodes, wherein the one or more read-only nodes operate as read replicas to process read operations for the distributed database;
at least one other node, of the plurality of nodes is configured to implement a read-write node, wherein the read-write node processes read operations and write operations for the distributed database to a distributed storage system storing data for the database, and wherein the read-write node is configured to:
determine, from the distributed storage system, a change to the distributed storage system, wherein the change identifies storage nodes of the distributed storage system storing data for a particular view of the database;
send, from the read-write node to the one or more read-only nodes, an update indicating the change at the distributed storage system;
each of the one or more read-only nodes is configured to:
receive, from the read-write node, the update indicating the change at the distributed storage system such that the read-only node receives the update without querying the distributed storage system; and
apply the received update to storage metadata maintained at the read-only node, wherein the storage metadata indicates an access scheme for the read-only node to obtain the data from the distributed storage system to service a read request for the particular view of the database such that a subsequent read request for the database is sent to the distributed storage system according to the updated access scheme.

2. The system of claim 1,
wherein each of the read-only nodes is further configured to receive a consistency point for the database, wherein the consistency point indicates the particular view of the database persisted at the distributed storage system;

wherein said application of the received update to the storage metadata at the read-only node is performed in response to receiving the consistency point indication.

3. The system of claim 2, wherein each of the read-only nodes is further configured to:
receive a read request for the database;
determine a storage node of the distributed storage system that persists the data according to the consistency point indication based, at least in part, on the storage metadata; and
send the read request for the database to the determined storage node in order to service the read request.

4. The system of claim 1, wherein each of the one or more read-only nodes is further configured to:
upon recovery of a failure of the read-only node:
determine that the storage metadata maintained at the read-only node is not current;
establish a connection with the read-write node to receive new storage metadata updates;
request from the distributed storage system a current version of the storage metadata;
receive the current version of the storage metadata; and
update the storage metadata maintained at the read-only node according to the received current version of the storage metadata.

5. A method, comprising:
performing, by one or more computing devices implementing a read-only node of a plurality of database nodes, wherein the plurality of database nodes implement a distributed database system:
maintaining storage metadata at the read-only node, wherein the storage metadata indicates an access scheme for the read-only node to obtain data stored for a particular view of the database at a distributed storage system in order to service a read request for the database;
receiving, from a read-write node of the plurality of database nodes, an update indicating a change to the distributed storage system, wherein the change affects validity of read requests for a different particular view of the database; and
updating the storage metadata according to the received update such that a subsequent read request for the database is sent to the distributed storage system according to the updated access scheme.

6. The method of claim 5, further comprising:
receiving, from the read-write node, a consistency point for the database, wherein the consistency point indicates that the different particular view of the database is persisted at the distributed storage system;
wherein said updating the storage metadata according to the received update is performed in response to receiving the consistency point.

7. The method of claim 6, further comprising:
receiving a read request for the database;
based, at least in part, on the storage metadata, determining a storage node for servicing the read request that persists data according to the consistency point; and
accessing the distributed storage system via the determined storage node.

8. The method of claim 7, wherein the determined storage node stores data sufficient to service the read request such that a read quorum including one or more additional storage nodes is not sent the read request.

9. The method of claim 6, further comprising:
receiving a read request for the database, wherein the read request is associated with the particular view of the database prior to the different particular view of the database indicated by the consistency point;
determining a storage node of the distributed database to be sent the read request based, at least in part, on the storage metadata maintained at the read-only node that does not include the received update to the storage metadata; and
sending the read request to the determined storage node in order to service the read request.

10. The method of claim 5, wherein the method further comprises:
in response to detecting a failure of the read-write node:
determining that the storage metadata for the data is not current;
requesting from the distributed storage system a current version of the storage metadata;
receiving the current version of the storage metadata; and
updating the storage metadata maintained at the read-only node according to the received current version of the storage metadata.

11. The method of claim 5, wherein different ones of a plurality of storage nodes implementing the distributed storage system together comprise a protection group for at least a portion of the data stored for the database, wherein the update indicating the change to the distributed storage system is change in membership of the protection group.

12. The method of claim 11, wherein the distributed database system is a network-based database service, wherein the distributed storage system is a multi-tenant, network-based storage service, wherein the distributed storage service implements a plurality of other protection groups for other portions of the data stored for the database service, wherein said receiving and said updating are performed in response to membership changes for each of the plurality of other protection groups.

13. A non-transitory, computer-readable storage medium, storing program instructions that when executed by one or more computing devices cause the one or more computing devices to implement a read-only node of a distributed database system that implements:
maintaining storage metadata at the read-only node, wherein the storage metadata indicates an access scheme for the read-only node to obtain data stored for a particular view of the database at a distributed storage system in order to service a read request for the database;
receiving, from a read-write node of the plurality of database nodes, an update indicating a change to the distributed storage system, wherein the change affects validity of read requests for a different particular view of the database; and
updating the storage metadata according to the received update such that a subsequent read request for the different particular view of the database is sent to the distributed storage system according to the updated access scheme.

14. The non-transitory, computer-readable storage medium of claim 13, wherein the read-only node further implements:
receiving, from the read-write node, a consistency point for the database, wherein the consistency point indicates that the different particular view of the database is persisted at the distributed storage system;

wherein said updating the storage metadata according to the received update is performed in response to receiving the consistency point.

15. The non-transitory, computer-readable storage medium of claim 14, wherein the read-only node further implements:

receiving a read request for the database;

based, at least in part, on the storage metadata, determining a storage node for servicing the read request that persists data according to the consistency point; and sending the read request to the determined at least one storage node.

16. The non-transitory, computer-readable storage medium of claim 15, wherein the read request for the database requests the different particular view of the database, wherein the determined storage node is a previously unidentified storage node indicated in the change to the storage metadata.

17. The non-transitory, computer-readable storage medium of claim 15, wherein the distributed storage system storing the data for the distributed database is a log-structured data store maintaining a plurality of log records that each include a different log sequence identifier, wherein the consistency point received from the read-write node is a log sequence identifier, wherein the read request is associated with a log sequence identifier indicating the different particular view of the database, and wherein determining the storage node for servicing the read request is further based, at least in part, on the log sequence identifier associated with the read request and the log sequence identifier received as the consistency point.

18. The non-transitory, computer-readable storage medium of claim 15, wherein the determined storage node stores data sufficient to service the read request such that a read quorum including one or more additional storage nodes is not sent the read request.

19. The non-transitory, computer-readable storage medium of claim 13, wherein different ones of a plurality of storage nodes implementing the distributed storage system together comprise a protection group for at least a portion of the data stored for the database, wherein the update indicating the change to the distributed storage system is change in membership of the protection group.

20. The non-transitory, computer-readable storage medium of claim 19, wherein the distributed database system is a network-based database service, wherein the distributed storage system is a multi-tenant, network-based storage service, wherein the distributed storage service implements a plurality of other protection groups for other portions of the data stored for the database service, wherein said maintaining, said receiving, and said updating are performed in response to membership changes for each of the plurality of other protection groups.

* * * * *